United States Patent
Zeung et al.

(10) Patent No.: US 9,237,217 B2
(45) Date of Patent: Jan. 12, 2016

(54) DOCKING STATION FOR SIMULTANEOUSLY ESTABLISHING CONNECTIONS FROM A SMARTPHONE TO AN EXTERNAL DISPLAY AND USB DEVICE

(71) Applicants: Ping-Shun Zeung, Taipei (TW); Johnny Chen, Taipei (TW)

(72) Inventors: Ping-Shun Zeung, Taipei (TW); Johnny Chen, Taipei (TW)

(73) Assignee: I/O INTERCONNECT, LTD., Santa Ana, CA (US)

( * ) Notice: Subject to any disclaimer, the term of this patent is extended or adjusted under 35 U.S.C. 154(b) by 314 days.

(21) Appl. No.: 13/896,282

(22) Filed: May 16, 2013

(65) Prior Publication Data

US 2014/0342669 A1    Nov. 20, 2014

(51) Int. Cl.
| | |
|---|---|
| H04M 1/04 | (2006.01) |
| H04M 1/725 | (2006.01) |
| G06F 1/16 | (2006.01) |

(52) U.S. Cl.
CPC ........... *H04M 1/7253* (2013.01); *G06F 1/1632* (2013.01); *H04M 1/04* (2013.01)

(58) Field of Classification Search
CPC .................. G06F 1/1632; H04M 1/72527
See application file for complete search history.

(56) References Cited

U.S. PATENT DOCUMENTS

| | | | |
|---|---|---|---|
| 2003/0033452 A1* | 2/2003 | Himmel et al. .................. 710/9 |
| 2003/0222149 A1* | 12/2003 | Solomon et al. ......... 235/472.01 |
| 2003/0222848 A1* | 12/2003 | Solomon et al. .............. 345/156 |
| 2006/0203758 A1* | 9/2006 | Tee et al. ....................... 370/315 |
| 2007/0077784 A1* | 4/2007 | Kalayjian et al. ............... 439/61 |
| 2011/0125601 A1* | 5/2011 | Carpenter et al. ........... 705/26.1 |
| 2011/0126005 A1* | 5/2011 | Carpenter et al. ............ 713/158 |
| 2012/0203949 A1* | 8/2012 | Benhard et al. .............. 710/303 |
| 2014/0019653 A1* | 1/2014 | Amchislaysky et al. ..... 710/106 |
| 2014/0337556 A1* | 11/2014 | Gu et al. ....................... 710/303 |
| 2014/0344494 A1* | 11/2014 | Zeung et al. ................. 710/303 |
| 2014/0344495 A1* | 11/2014 | Zeung et al. ................. 710/303 |
| 2015/0016417 A1* | 1/2015 | Dees et al. .................... 370/331 |

* cited by examiner

*Primary Examiner* — Bobbak Safaipour
*Assistant Examiner* — Devan Sandiford

(57) ABSTRACT

A dock for connecting a smartphone to a display and peripherals is disclosed. The dock uses a single connector to transfer audio/video data to a display and input-output data and to establish a wireless link with peripherals. The dock has a controller with a switch, a wireless communication module, a USB hub, a relay, a first connector, an audio/video (AV) converter and a second connector. The relay normally connects AV data from the smartphone to the AV converter. The controller switches the relay while the switch is being operated, and then the controller links the USB hub, the first connector and the wireless communication module, and the wireless communication module establishes the wireless link with the smartphone.

14 Claims, 7 Drawing Sheets

DOCKING STATION FOR SIMULTANEOUSLY ESTABLISHING CONNECTIONS FROM A SMARTPHONE TO AN EXTERNAL DISPLAY AND USB DEVICE

BACKGROUND OF THE INVENTION

1. Technical Field

The invention relates to docking stations, particularly to docking stations between a portable electronic device and peripherals.

2. Related Art

A smartphone is a mobile phone built on a mobile operating system, with more advanced computing capability connectivity than a conventional cellular phone. In essence, a smartphone is a computer-based cellular phone. As a result, more and more users treat a smartphone as a mixture of a cellular phone and a laptop or tablet computer.

There must be a rechargeable battery, a touchscreen panel and a connection port in a smartphone. When a smartphone is used as a laptop computer at home or office, a docking station is needed for charging battery, data communication and connecting human interface devices (HIDs) such as a keyboard and mouse. Also, an external display much larger than the touchscreen panel of a smartphone is required by most users.

Generally, a smartphone is provided with only one communication port, for example, a micro-USB port. For both input/output bidirectional data communication and audio/video unidirectional data transmission, some smartphones are provided with a micro-USB port with a built-in mobile audio/video interface such as the Mobile High-Definition Link (MHL) or the Mobility DisplayPort (MyDP) interface.

However, such an MHL-enabled or MyDP-enabled micro-USB port has to cease its USB functions while the MHL or MyDP function is being activated, and vice versa. In more detail, a user cannot use the MHL-enabled or MyDP-enabled micro-USB port to connect a keyboard, mouse or any other USB-HIDs when the port is connected to an external display. The only solution to simultaneously connect an external display and HIDs is to wirelessly connect HIDs via BLUETOOTH and to wiredly connect an external display via the MHL-enabled or MyDP-enabled micro-USB port. This is inconvenient and complicated for users. Furthermore, BLUETOOTH HIDs are much more expensive than general USB-HIDs.

There is some smartphone manufacture to provide a smartphone product with a proprietary hybrid interface connector that combines two sub-connectors—one for audio/video data transmission and the other one for USB data communication. However, such a proprietary connector lacks compatibility with other smartphone or peripheral manufactures. Users' selectivity is seriously limited.

SUMMARY OF THE INVENTION

An object of the invention is to provide a dock station which can simultaneously operatively link an external display and USB devices.

To accomplish the above object, the docking station of the invention includes a controller with a switch, a wireless communication module, a universal serial bus (USB) hub, a relay, a first connector, an audio/video (AV) converter, and a second connector.

The wireless communication module is coupled to the controller and capable of establishing a wireless link with an external portable electronic device. The USB hub is coupled to the controller. The relay has a control terminal and multiple rows of change-over contacts. Each row of change-over contact has a common terminal, a normally-open contact and a normally-closed contact, and the control terminal and the normally-open contacts are coupled to the controller. The first connector is coupled to the common terminals of the relay for connecting the external portable electronic device. The AV converter is coupled to the normally-closed contacts of the relay for converting first AV data into second AV data. The second connector is coupled to the AV converter for outputting the second AV data. The relay normally connects the first connector to the AV converter for transferring the first AV data from the external portable electronic device to the second connector. The controller makes the relay switch through the control terminal while the switch is being operated, and then the controller links the USB hub, the first connector and the wireless communication module and the wireless communication module establishes the wireless link with the external portable electronic device.

DETAILED DESCRIPTION OF THE INVENTION

Figure 1:
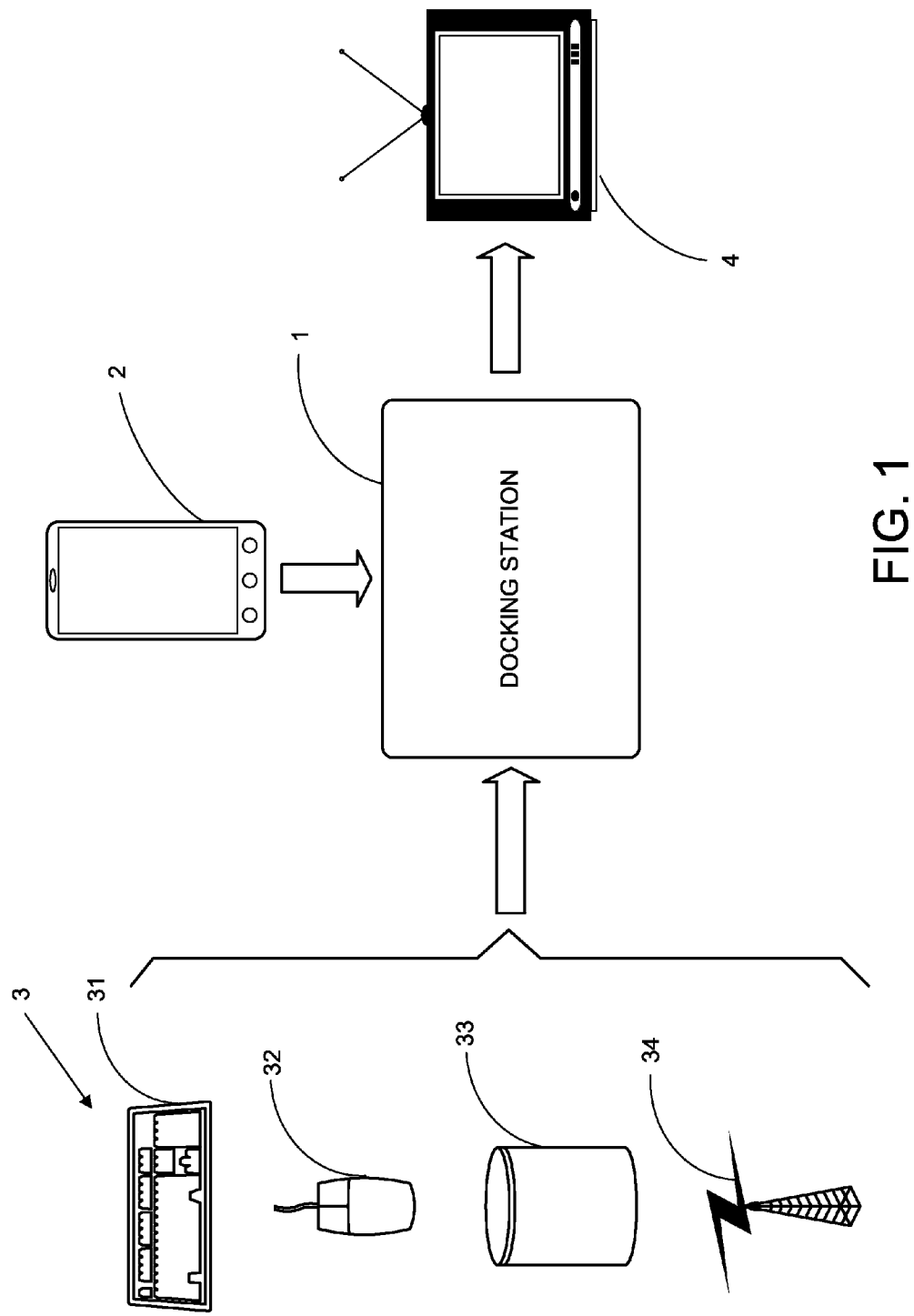
FIG. 1 is a schematic view of the invention in use.

Please refer to FIG. 1, which depicts topology of the docking station of the invention in use. As shown, the docking station 1 is materially connected with a portable electronic device such as a smartphone 2, a display 4 and USB devices 3 such as a keyboard 31, mouse 32, hard disk drive 33 and Wi-Fi access point 34. The docking station 1 can simultaneously output audio/video (AV) data to the display 4 and access the USB devices 3. Of course, the smartphone 2 must be provided with a micro-USB connector with a mobile AV interface such as the Mobile High-Definition Link (MHL) standard or the Mobility DisplayPort (MyDP) standard.

Figure 2:
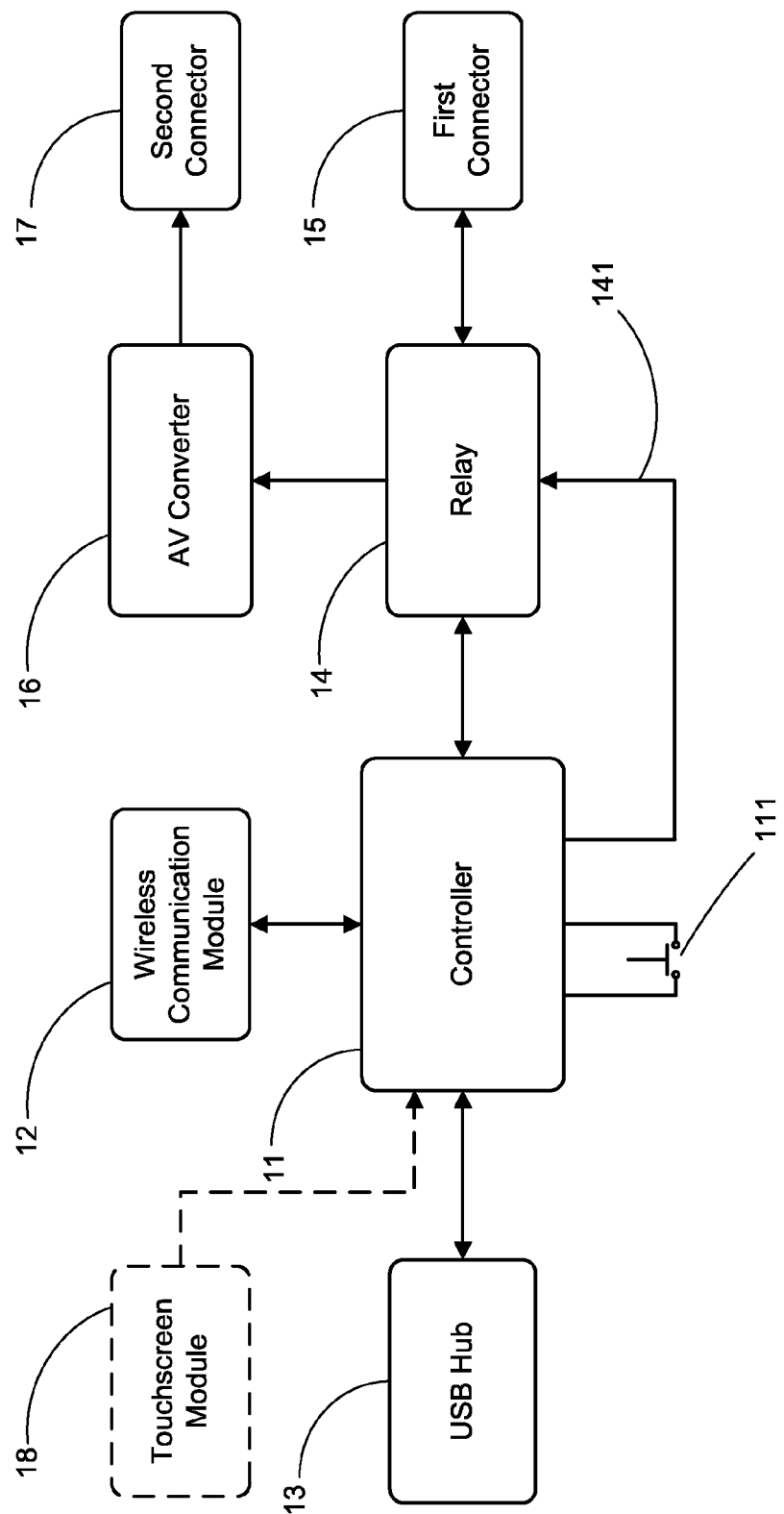
FIG. 2 is a block diagram of the invention.

FIG. 2 shows a block diagram of the docking station 1 of the invention. As shown, the docking station 1 includes a controller 11 with a switch 111, a wireless communication module 12, a universal serial bus (USB) hub 13, a relay 14, a first connector 15, an audio/video (AV) converter 16, and a second connector 17.

The controller 11 may be an ARM SoC (System-on-Chip) processor. The switch 111 connected to the controller 11 may be a normally-open push-button switch. The wireless communication module 12 is coupled to the controller 11 and capable of establishing two wireless links with the smartphone 2. Preferably, the wireless communication module 12 is provided with a BLUETOOTH interface and a Wi-Fi interface. Accordingly, the two wireless links are compliant with the BLUETOOTH standard and the Wi-Fi standard. The USB hub 13 is coupled to the controller 11 for linking the USB devices 3. The USB devices 3 can be categorized into human interface devices (HIDs) and storages. For example, the HIDs may be a keyboard and mouse, and the storages may be a hard disk drive and flash drive. The two wireless links are used for separately connecting the HIDs and storages.

Figure 3:
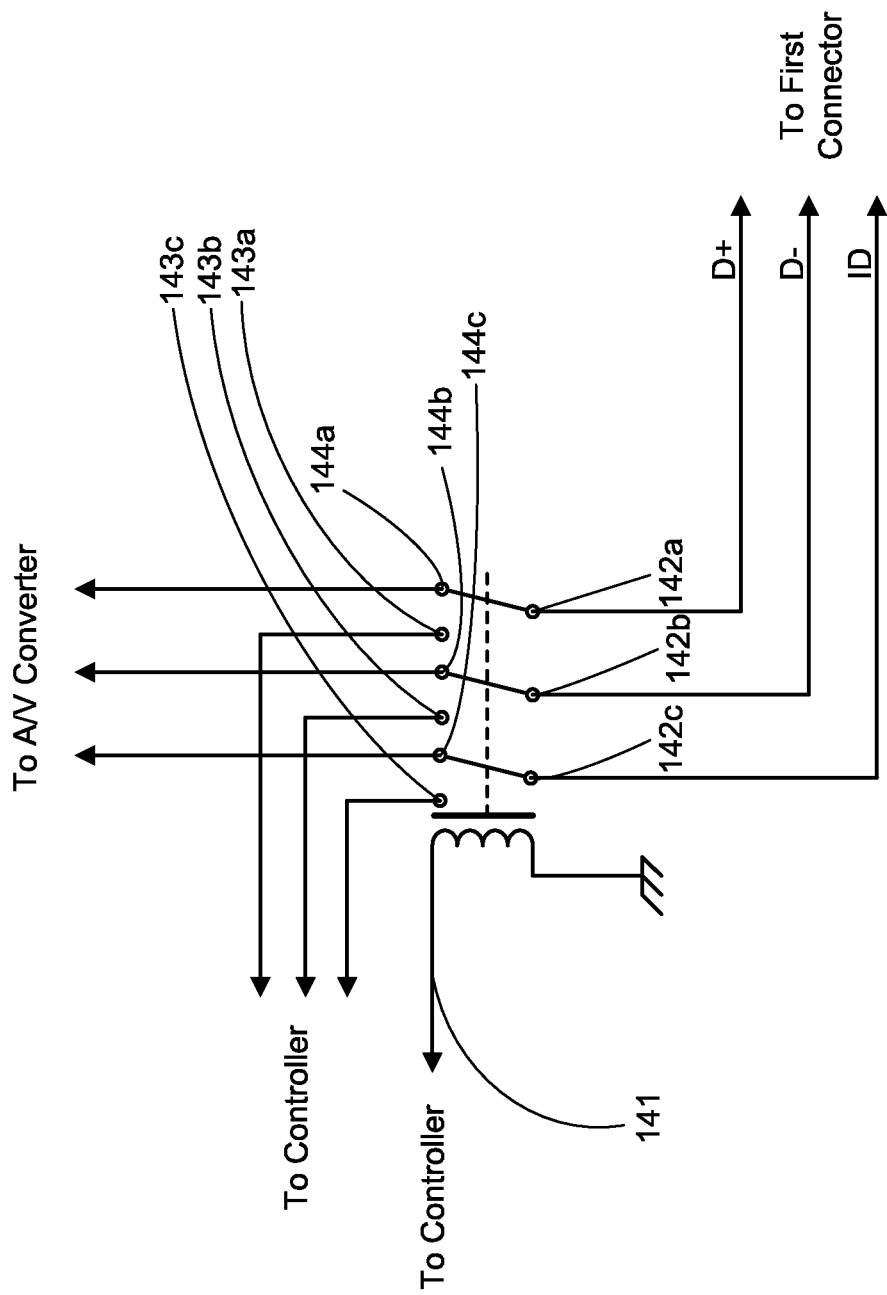
FIG. 3 is a schematic view of a first embodiment of the relay.
Figure 4:
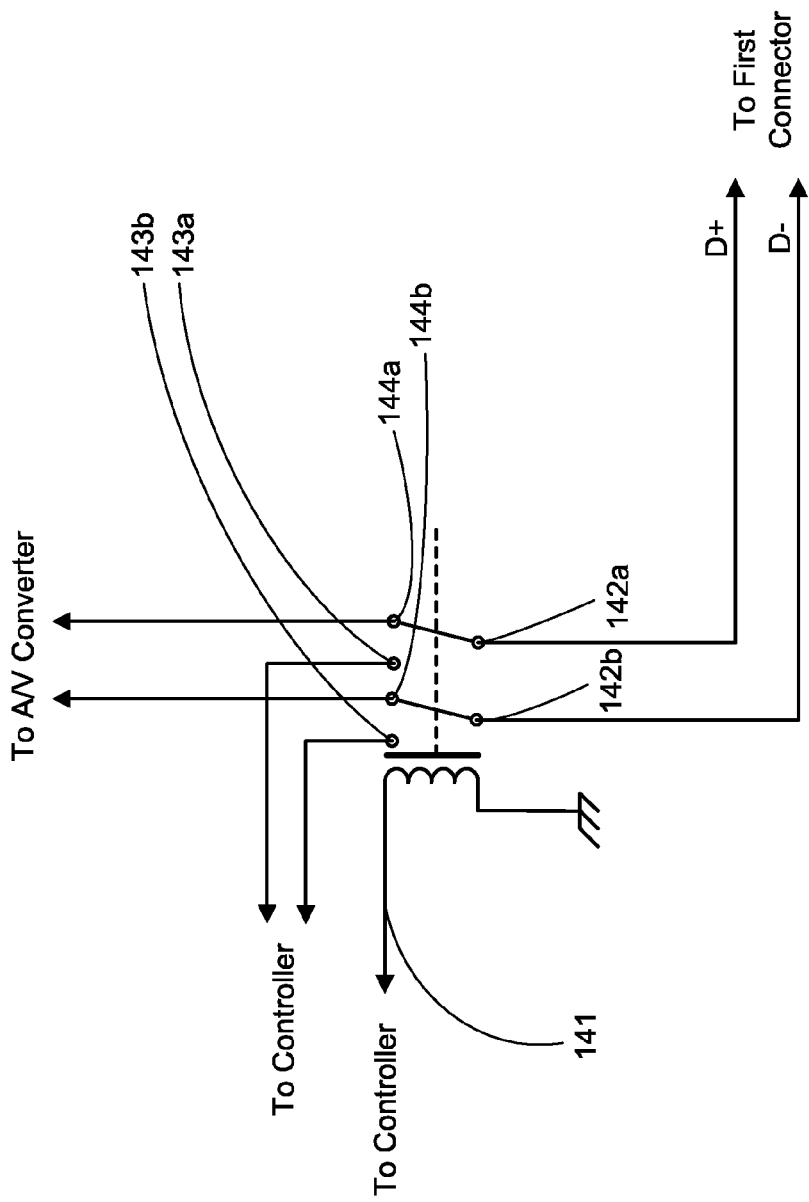
FIG. 4 is a schematic view of a second embodiment of the relay.

Please refer to FIGS. 2, 3 and 4. The relay 14 has a control terminal 141 and multiple rows of change-over contacts. Preferably, the multiple rows are two or three in number because there are two or three pins that are needed to be switched when the first connector is a USB connector, namely, D+ and D− pins or D+, D− and ID pins. In other words, the relay 14 is of a double pole double throw (DPDT) type or a three pole double throw (3PDT) type. FIGS. 3 and 4 show the 3PDT typed relay 14 and the 2PDT typed relay 14, respectively. Each row of change-over contacts includes a common terminal 142a, 142b and 142c, a normally-open contact 143a, 143b and 143c, and a normally-closed contact 144a, 144b and 144c. The control terminal 141 and the normally-open contacts 143a, 143b and 143c are coupled to the controller 11. The first connector 15 is a USB receptacle and coupled to the common terminals 142a, 142b and 142c for connecting the smartphone 2.

Please refer back to FIG. 2. The AV converter 16 is coupled to the normally-closed contacts 144a, 144b and 144c of the relay 14 for converting first AV data into second AV data. The first AV data comes from the mobile AV interface abovementioned and from the smartphone 2. Preferably, the second AV data is compliant with the High-Definition Multimedia Interface (HDMI) standard. The second connector 17 is coupled to the AV converter 16 for outputting the second AV data and can be used for linking the display 4 with a connector corresponding to the second connector 17.

Figure 5:
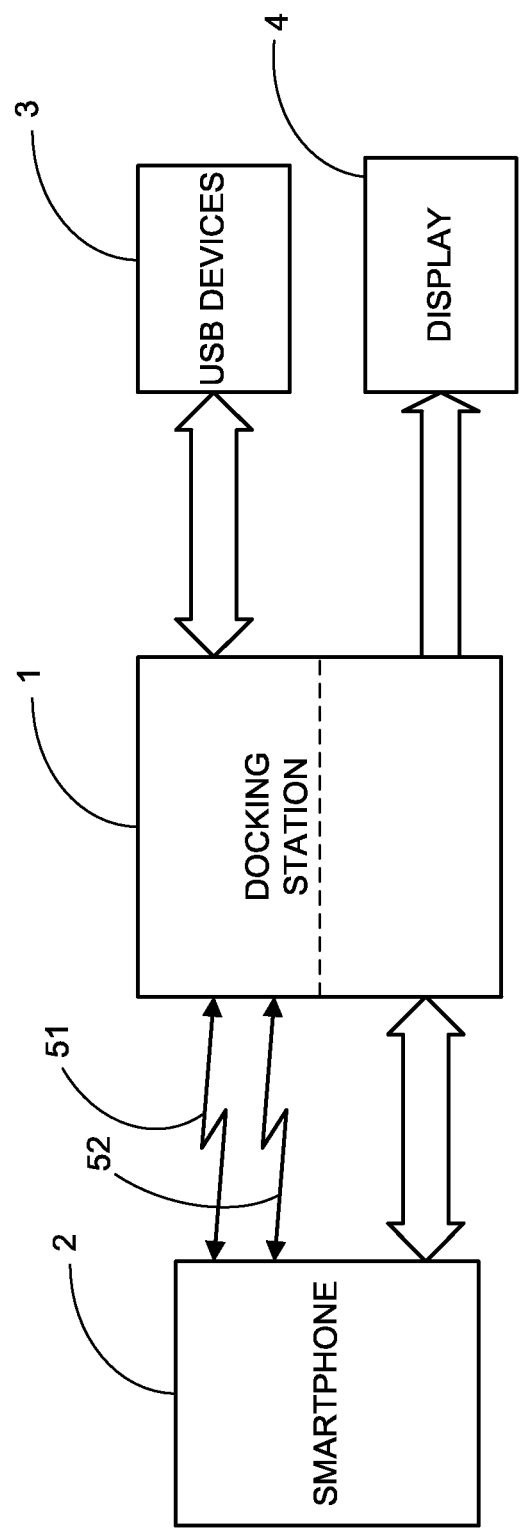
FIG. 5 is a schematic view showing the data flow of the invention.

Please refer to FIGS. 2 and 5. When the smartphone 2 and the display 4 have been connected to the first connector 15 and the second connector 17, respectively, the relay 14 normally connects the first connector 15 to the AV converter 16 for transferring the first AV data from the smartphone 2 to the second connector 17. That is, the first AV data from the smartphone 2 can be constantly shown on the display 17. At this time, the first connector 15 serves as an AV input port. When a user wants to link USB devices 3 with the smartphone 2, the USB devices 3 have to be connected to the USB hub 13. The controller 11 sends a control signal to the relay 14 through the control terminal 141 to switch the relay 14 while the switch 111 is being operated. And then the controller 11 links the smartphone 2 connected to the first connector 15 and functions as a USB device of the smartphone 2 to obtain information of the smartphone 2, and finally the wireless communication module 12 establishes the two wireless links 51, 52 with the smartphone 2. One of the two wireless links 51, 52, namely, the BLUETOOTH, serves as an exclusive communication channel for USB HIDs. The other one of the wireless links 51, 52, namely, the Wi-Fi, serves as another exclusive communication channel for USB storages. At this time, the first connector 15 is switched to serve as a USB port, the controller 11 temporarily serves as a USB device of the smartphone 2 to obtain information of the smartphone 2, and finally the wireless communication module 12 makes data transfer between the USB devices 3 and the smartphone 2 through the wireless links 51 and 52. After the wireless links 51 and 52 have been established and the switch 111 is not operated, the relay 14 connects the first connector 15 to the AV converter 16 again.

Preferably, the docking station 1 may further include a touchscreen module 18 connected to the controller 11. When the docking station 1 is built in the display 4 to be an inseparable portion of the display 4, the touchscreen module 18 may associate with the display 4 to provide a touching input function.

Figure 6:
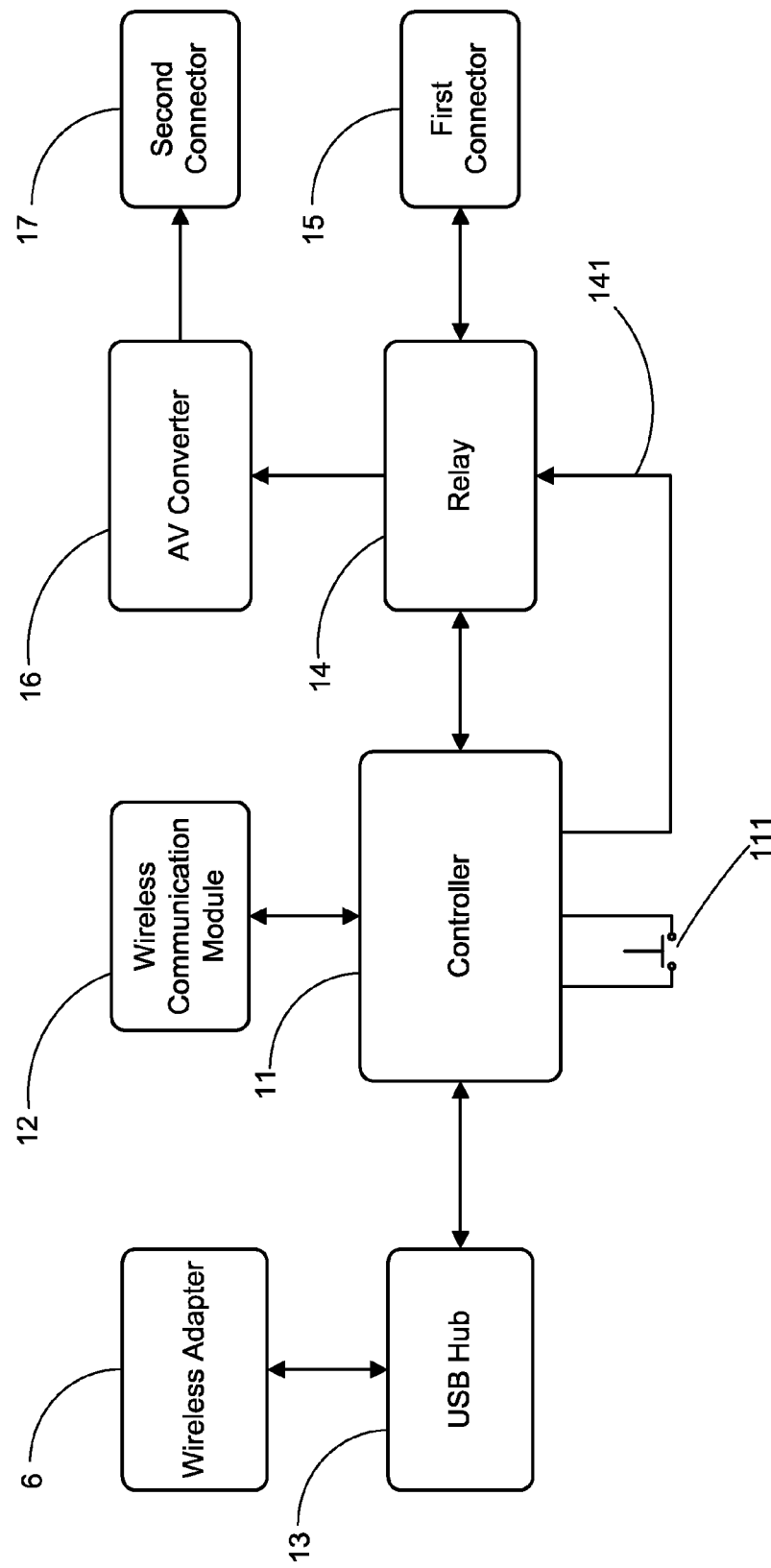
FIG. 6 is a block diagram of another embodiment of the invention.

Alternately, one of the wireless interfaces of the wireless communication module 12 can be divided from the wireless communication module 12 to be an independent module such as a USB dongle. As shown in FIG. 6, a wireless adapter 6, which is a Wi-Fi adapter or a BLUETOOTH adapter, is coupled to the USB hub 13.

Figure 7:
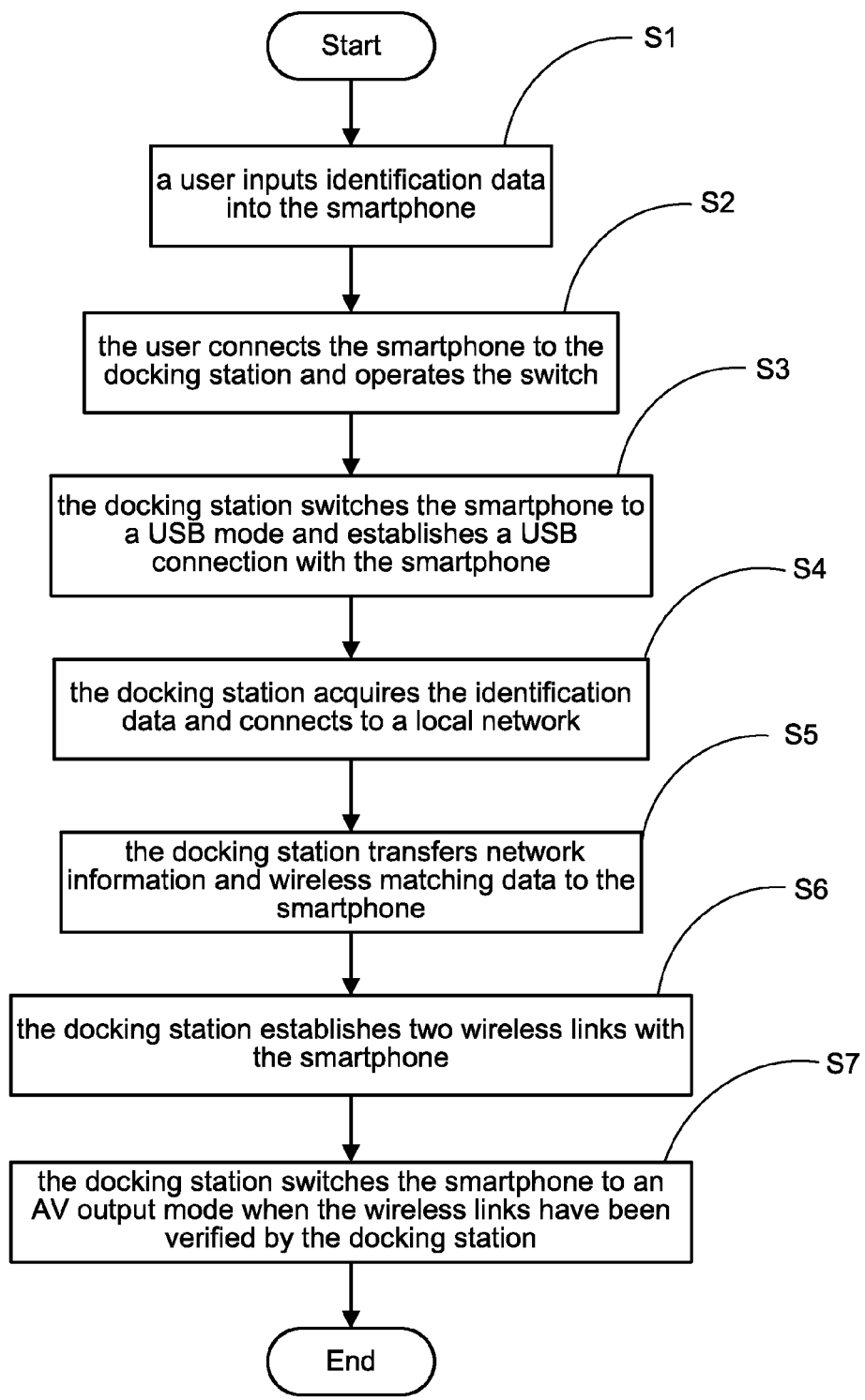
FIG. 7 is a flowchart of a method for linking a USB device to a smartphone via the docking station according to the invention.

FIG. 7 shows a flowchart of a method for linking a USB device 3 to a smartphone 2 via the docking station 1. In step S1, a user inputs identification data into the smartphone 2. The identification data includes service set identification (SSID) and a password. In step S2, the user connects the smartphone 2 to the docking station 1 and operates the switch 111. In step S3, the docking station 1 switches the smartphone 2 to a USB mode and establishes a USB connection with the smartphone 2. In step S4, the docking station 1 acquires the identification data and connects to a local network. In step S5, the docking station 1 transfers network information and wireless matching data to the smartphone 2. In step S6, the docking station 1 establishes two wireless link 51 or 52 with the smartphone 2. Finally, in step S7, the docking station switches the smartphone 2 to an audio/video output mode when the wireless link 51 or 52 has been verified by the docking station 1. It will be appreciated by persons skilled in the art that the above embodiments have been described by way of example only and not in any limitative sense, and that various alterations and modifications are possible without departure from the scope of the invention as defined by the appended claims.

What is claimed is:

1. A docking station comprising:
   a controller;
   a first switch, coupled to the controller;
   a wireless communication module, coupled to the controller, and being capable of establishing at least one wireless link with an external portable electronic device;
   a universal serial bus (USB) hub, coupled to the controller for linking a USB device;
   a relay, having a control terminal and multiple rows of change-over contacts, wherein each row of change-over contacts has a common terminal, a normally-open contact and a normally-closed contact, and the control terminal and the normally-open contacts are coupled to the controller;
   a first connector, coupled to the common terminals of the relay for connecting the external portable electronic device;
   an audio/video (AV) converter, coupled to the normally-closed contacts of the relay for converting first AV data into second AV data; and
   a second connector, coupled to the AV converter for outputting the second AV data to an external display;
   wherein the relay switchably connects the first connector to either the AV converter or the controller, the relay normally connects the first connector to the AV converter for transferring the first AV data from the external portable electronic device to the external display through the AV converter when the first switch is not operated, while the first switch is being operated, the controller controls the relay to switch through the control terminal, then the controller links the external portable electronic device connected to the first connector and functions as a virtual USB device of the external portable electronic device to obtain information thereof, the first connector is switched to serve as a USB port, the wireless communication module establishes the at least one wireless link with the external portable electronic device, finally the wireless communication module makes data transfer between the USB device and the external portable electronic device through the at least one wireless link, and the relay restores to connect the first connector to the AV converter after the at least one wireless link has been established and the first switch is not operated.

2. The docking station of claim 1, wherein the first switch is a push-button switch.

3. The docking station of claim 1, wherein the at least one wireless link is one in number.

4. The docking station of claim 3, wherein the wireless link is a BLUETOOTH link or a Wi-Fi link.

5. The docking station of claim 3, further comprising a wireless adapter coupled to the USB hub.

6. The docking station of claim 5, wherein the wireless adapter is a BLUETOOTH adapter or a Wi-Fi adapter.

7. The docking station of claim 1, wherein the at least one wireless link is two in number.

8. The docking station of claim 7, wherein the two wireless links are a BLUETOOTH link and a Wi-Fi link.

9. The docking station of claim 1, wherein the first AV data is compliant with either of a Mobile High-Definition Link (MHL) standard or a Mobility DisplayPort (MyDP) standard.

10. The docking station of claim 1, wherein the second connector and the second AV data are compliant with a High-Definition Multimedia Interface (HDMI) standard.

11. The docking station of claim 1, wherein the first connector is a USB connector.

12. The docking station of claim 1, wherein the relay is of a two pole double throw (DPDT) type.

13. The docking station of claim 1, wherein the relay is of a three pole double throw (3PDT) type.

14. The docking station of claim 1, further comprising a touchscreen module coupled to the controller.

* * * * *